(12) United States Patent
Ishibashi et al.

(10) Patent No.: US 12,196,034 B2
(45) Date of Patent: Jan. 14, 2025

(54) GLASS PANEL UNIT

(71) Applicant: Panasonic Intellectual Property Management Co., Ltd., Osaka (JP)

(72) Inventors: Tasuku Ishibashi, Ishikawa (JP); Eiichi Uriu, Osaka (JP); Kazuya Hasegawa, Osaka (JP); Hiroyuki Abe, Osaka (JP); Kenji Hasegawa, Osaka (JP); Masataka Nonaka, Osaka (JP); Takeshi Shimizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 536 days.

(21) Appl. No.: 17/599,976

(22) PCT Filed: Mar. 5, 2020

(86) PCT No.: PCT/JP2020/009299
§ 371 (c)(1),
(2) Date: Sep. 29, 2021

(87) PCT Pub. No.: WO2020/203008
PCT Pub. Date: Oct. 8, 2020

(65) Prior Publication Data
US 2022/0154522 A1 May 19, 2022

(30) Foreign Application Priority Data

Mar. 29, 2019 (JP) .................. 2019-068230

(51) Int. Cl.
*E06B 3/66* (2006.01)
*C03C 17/00* (2006.01)
(Continued)

(52) U.S. Cl.
CPC .......... *E06B 3/6612* (2013.01); *C03C 17/002* (2013.01); *E06B 3/66342* (2013.01);
(Continued)

(58) Field of Classification Search
CPC ...... E06B 3/6612; E06B 3/6625; E06B 3/663; E06B 3/66304; E06B 3/66342;
(Continued)

(56) References Cited

U.S. PATENT DOCUMENTS 3,379,859 A * 4/1968 Marriott ............... H05B 1/0236
219/203
3,475,594 A * 10/1969 Aisanich ................. H02H 5/10
219/509
(Continued)

FOREIGN PATENT DOCUMENTS

CN 102323698 A * 1/2012 ............. B32B 17/06
CN 103261960 B * 8/2017 ....... B32B 17/10055
(Continued)

OTHER PUBLICATIONS

JPH0595220 Document and Machine Translation (Year: 1993).*
(Continued)

*Primary Examiner* — Ryan D Kwiecinski
(74) *Attorney, Agent, or Firm* — Rimon P.C.

(57) ABSTRACT

Provided is a glass panel unit that reduces the chances of an electric wire extended being disconnected. A glass panel unit includes a first panel, a second panel, a seal, a connecting void, and an electric wire. The first panel includes a first glass pane. The second panel includes a second glass pane and is arranged to face the second glass pane. The seal has a frame shape and hermetically bonds respective peripheral edge portions of the first panel and the second panel to create an internal space between the first panel and the second panel. The connecting void is provided for a portion, other
(Continued)

than a portion facing the internal space, of at least one of the first panel or the second panel. The electric wire is extended from the internal space to the connecting void by passing through the seal.

8 Claims, 15 Drawing Sheets

(51) Int. Cl.
    *E06B 3/663*     (2006.01)
    *E06B 3/67*     (2006.01)
    *E06B 3/673*     (2006.01)
    *H01Q 1/14*     (2006.01)

(52) U.S. Cl.
    CPC ............ *E06B 3/6736* (2013.01); *H01Q 1/14* (2013.01); *C03C 2217/70* (2013.01)

(58) Field of Classification Search
    CPC ............ E06B 3/66357; E06B 3/66376; E06B 3/6736; E06B 3/6775; E06B 2003/6638
    See application file for complete search history.

(56) References Cited

U.S. PATENT DOCUMENTS

| | | | | |
|---|---|---|---|---|
| 3,489,884 A * | 1/1970 | Waseleski, Jr. | ....... | B60S 1/3805 219/505 |
| 5,543,601 A * | 8/1996 | Bartrug | ............. | B32B 17/10174 338/322 |
| 5,557,289 A * | 9/1996 | Ohara | .................. | H01Q 1/1271 343/704 |
| 5,852,284 A * | 12/1998 | Teder | ........................ | H05B 3/84 219/219 |
| 6,051,820 A * | 4/2000 | Poix | .................... | E06B 3/66304 219/202 |
| 6,144,017 A * | 11/2000 | Millett | ................. | H05B 1/0236 219/203 |
| 7,002,115 B2 * | 2/2006 | Gerhardinger | .......... | B60L 8/003 219/203 |
| 7,204,102 B1 * | 4/2007 | Eames | .................... | C03C 27/08 65/36 |
| 10,465,436 B2 * | 11/2019 | Sønderkær | ............ | E06B 3/6612 |
| 11,466,508 B2 * | 10/2022 | Sala | .................. | H01L 31/02008 |
| 2006/0077109 A1 * | 4/2006 | Baba | ...................... | H01Q 1/1278 343/704 |
| 2008/0024050 A1 * | 1/2008 | Kobayashi | ............ | H01J 31/127 313/495 |
| 2013/0134396 A1 * | 5/2013 | Shimomura | .......... | C03B 23/203 428/61 |
| 2018/0094475 A1 * | 4/2018 | Naito | ........................ | C03C 8/14 |
| 2018/0294386 A1 * | 10/2018 | Kaneko | .................... | C03C 8/24 |
| 2020/0123040 A1 * | 4/2020 | Lian | ..................... | E06B 3/6775 |
| 2021/0079716 A1 * | 3/2021 | Neander | ................. | G02F 1/161 |
| 2021/0221737 A1 * | 7/2021 | Shimizu | ................ | E06B 3/6612 |
| 2021/0270084 A1 * | 9/2021 | Abe | .................... | E06B 3/66333 |

FOREIGN PATENT DOCUMENTS

| | | | | |
|---|---|---|---|---|
| EP | 894935 A1 * | 2/1999 | .......... | A47F 3/0434 |
| JP | H11-130479 A | 5/1999 | | |
| JP | 2007042425 A * | 2/2007 | | |
| JP | 2016-069232 A | 5/2016 | | |
| WO | WO-2013010743 A1 * | 1/2013 | ......... | E06B 3/66314 |
| WO | WO-2016084382 A1 * | 6/2016 | ............. | C03C 27/06 |
| WO | WO-2016121332 A1 * | 8/2016 | | |
| WO | 2016/185776 A1 | 11/2016 | | |
| WO | 2018/137354 A1 | 8/2018 | | |

OTHER PUBLICATIONS

International Search Report issued in corresponding International Patent Application No. PCT/JP2020/009299, dated May 26, 2020, with English translation.
Extended European Search Report dated May 9, 2022 issued for the corresponding European Patent Application No. 20781852.7.

* cited by examiner

GLASS PANEL UNIT

CROSS REFERENCE TO RELATED APPLICATIONS

This patent application is the U.S. National Phase under 35 U.S.C. § 371 of International Application No. PCT/JP2020/009299, filed on Mar. 5, 2020, which claims the benefit of Japanese Patent Application No. 2019-068230, dated Mar. 29, 2019, the entire contents of each are hereby incorporated by reference in their entirety.

TECHNICAL FIELD

The present disclosure generally relates to a glass panel unit, and more particularly relates to a glass panel unit including a first panel, a second panel, and a seal.

BACKGROUND ART

Patent Literature 1 discloses a glass panel unit. The glass panel unit of Patent Literature 1 includes a first glass panel, a second glass panel, a frame-shaped seal arranged between the first glass panel and the second glass panel to bond the first and second glass panels hermetically, and a gas adsorbing device. The gas adsorbing device includes a first electrode, a second electrode, and a gas adsorbing portion.

The first electrode has a first inside portion located inside a vacuum space surrounded with the first and second glass panels and the seal, and a first outside portion located outside the vacuum space. The second electrode has a second inside portion located inside the vacuum space and a second outside portion located outside the vacuum space. The gas adsorbing portion has a gas adsorbent including a getter and is connected between the first inside portion and the second inside portion.

In the glass panel unit of Patent Literature 1, the first outside portion and the second outside portion protrude from an end surface of the glass panel unit. Therefore, if an external terminal is connected to the first and second outside portions protruding from the end surface of the glass panel unit, the terminal and the glass panel unit are easily movable relative to each other, thus making a connecting portion between the first and second outside portions and the terminal disconnected easily.

CITATION LIST

Patent Literature

Patent Literature 1: JP 2016-069232 A

SUMMARY OF INVENTION

An object of the present disclosure to provide a glass panel unit that reduces the chances of an electric wire extended being disconnected.

A glass panel unit according to an aspect of the present disclosure includes a first panel, a second panel, a seal, a connecting void, and an electric wire. The first panel includes a first glass pane. The second panel includes a second glass pane and is arranged to face the first panel. The seal has a frame shape and hermetically bonds respective peripheral edge portions of the first panel and the second panel to create an internal space between the first panel and the second panel. The connecting void is provided for a portion, other than a portion facing the internal space, of at least one of the first panel or the second panel. The electric wire is extended from the internal space to the connecting void by passing through the seal.

DESCRIPTION OF EMBODIMENTS

Embodiments of a glass panel unit according to the present disclosure will now be described. Note that the embodiments to be described below are only exemplary ones of various embodiments of the present disclosure and should not be construed as limiting. Rather, the exemplary embodiments may be readily modified in various manners without departing from a true spirit and scope of the present disclosure.

Figure 1:
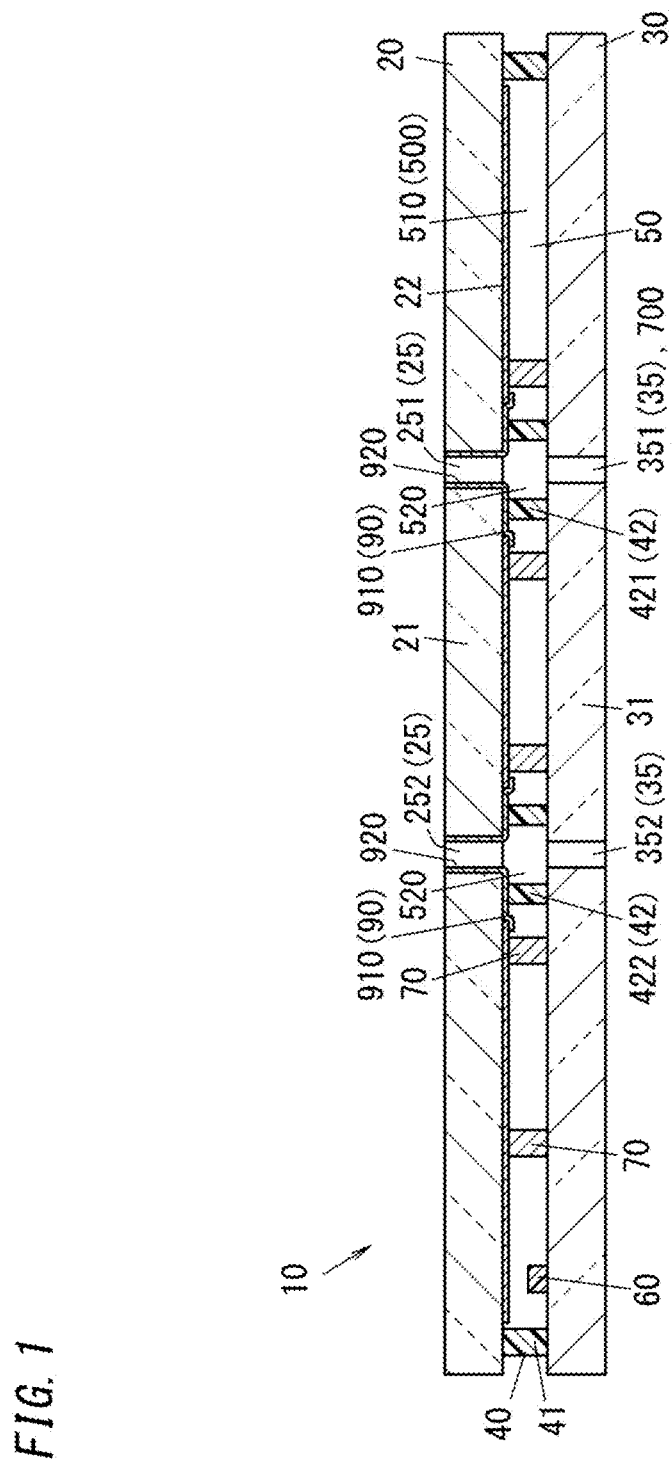
FIG. 1 is a schematic vertical sectional view of a glass panel unit according to a first embodiment.
Figure 2:
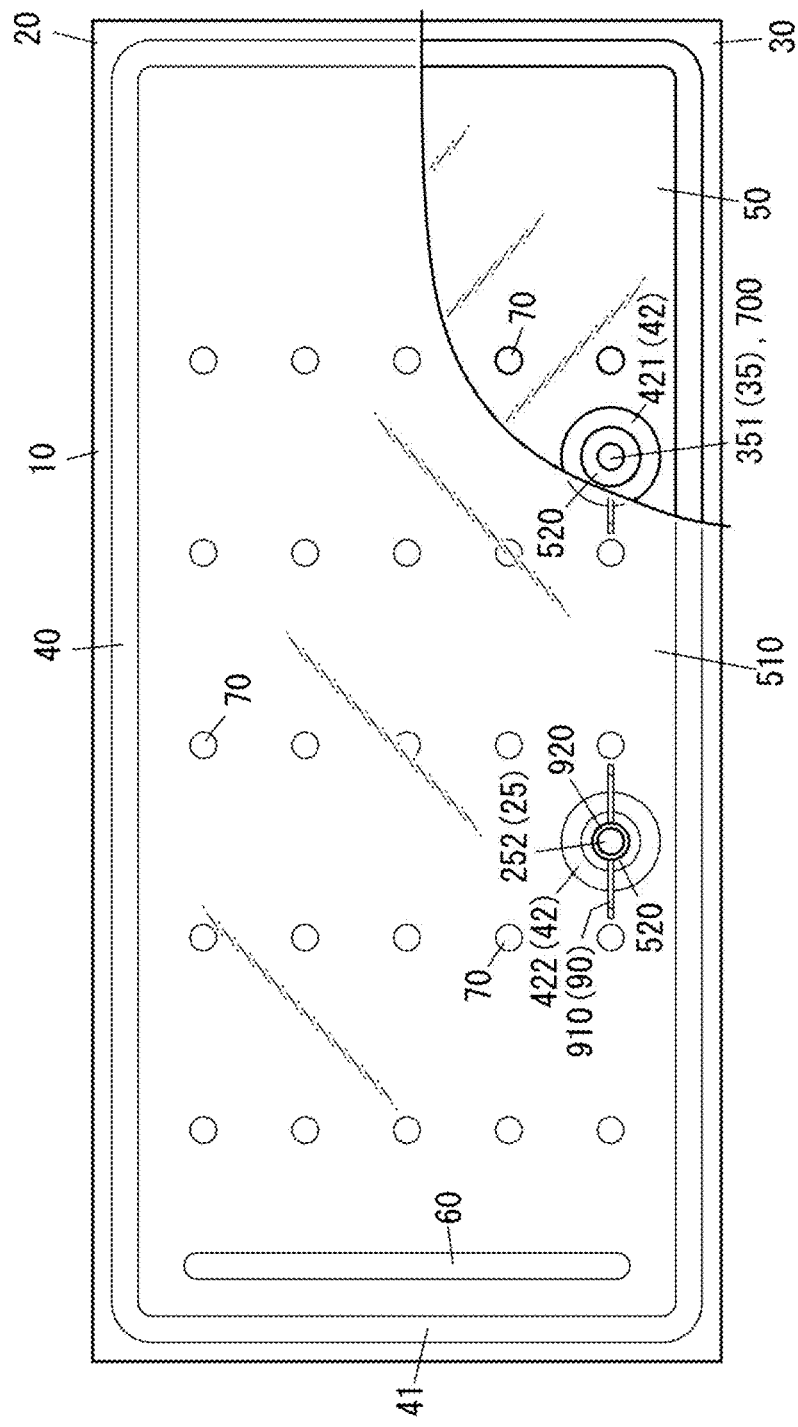
FIG. 2 is a partially cutaway, schematic plan view of the glass panel unit.

FIGS. 1 and 2 illustrate a (final product of) glass panel unit 10 according to a first embodiment. The glass panel unit 10 according to the first embodiment is a "vacuum-insulated glazing (or glass) (VIG) unit." The VIG unit is a type of multi-pane glazing unit including at least one pair of glass panels and having an evacuated space (or a vacuum space) between the pair of glass panels.

The glass panel unit 10 includes a first panel 20, a second panel 30, a seal 40, boundary walls 42, an evacuated space 50, and electric wires 910. In the first embodiment, the glass panel unit 10 further includes a gas adsorbent 60 and a plurality of the pillars 70.

The seal 40 has a frame shape and hermetically bonds respective peripheral edge portions of the first panel 20 and the second panel 30 to create an internal space 500 (including the evacuated space 50) between the first panel 20 and the second panel 30.

The boundary walls 42 hermetically bond the first panel 20 and the second panel 30 together to partition the internal space 500 into a first space 510 that is the hermetically sealed evacuated space 50 and second spaces 520, which are spatially separated from the first space 510.

The first panel 20 has first through holes 25 provided through portions, corresponding to the second spaces 520, of the first panel 20. The first through holes 25 serve as connecting voids. The second panel 30 has second through holes 35 provided through portions, corresponding to the second spaces 520 and facing the first through holes 25, of the second panel 30. In the first embodiment, the boundary walls 42 surround the first through holes 25 and the second through holes 35 when viewed in the direction in which the first panel 20 and the second panel 30 face each other.

The electric wires 910 are extended from the internal space 500 to the connecting voids (first through holes 25) by passing through the seal 40.

Figure 3:
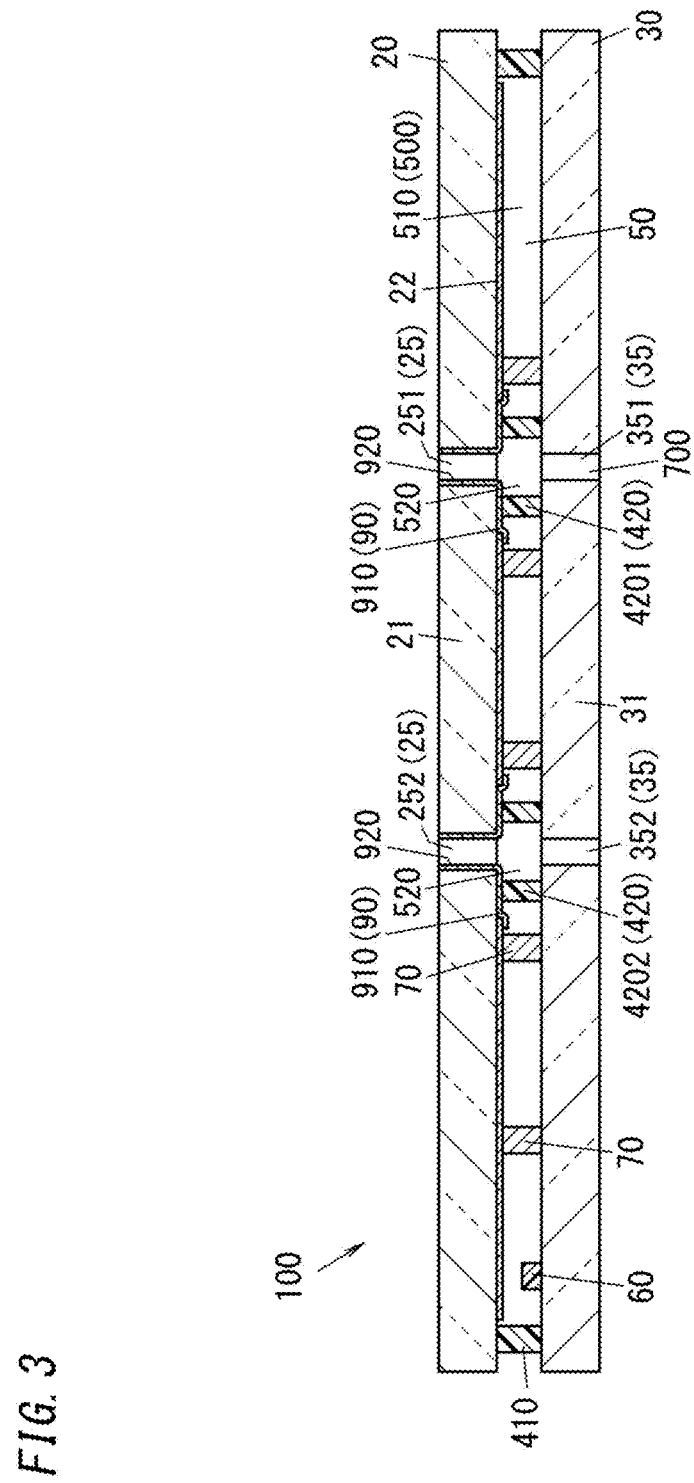
FIG. 3 is a schematic vertical sectional view of an assembly of the glass panel unit.
Figure 4:
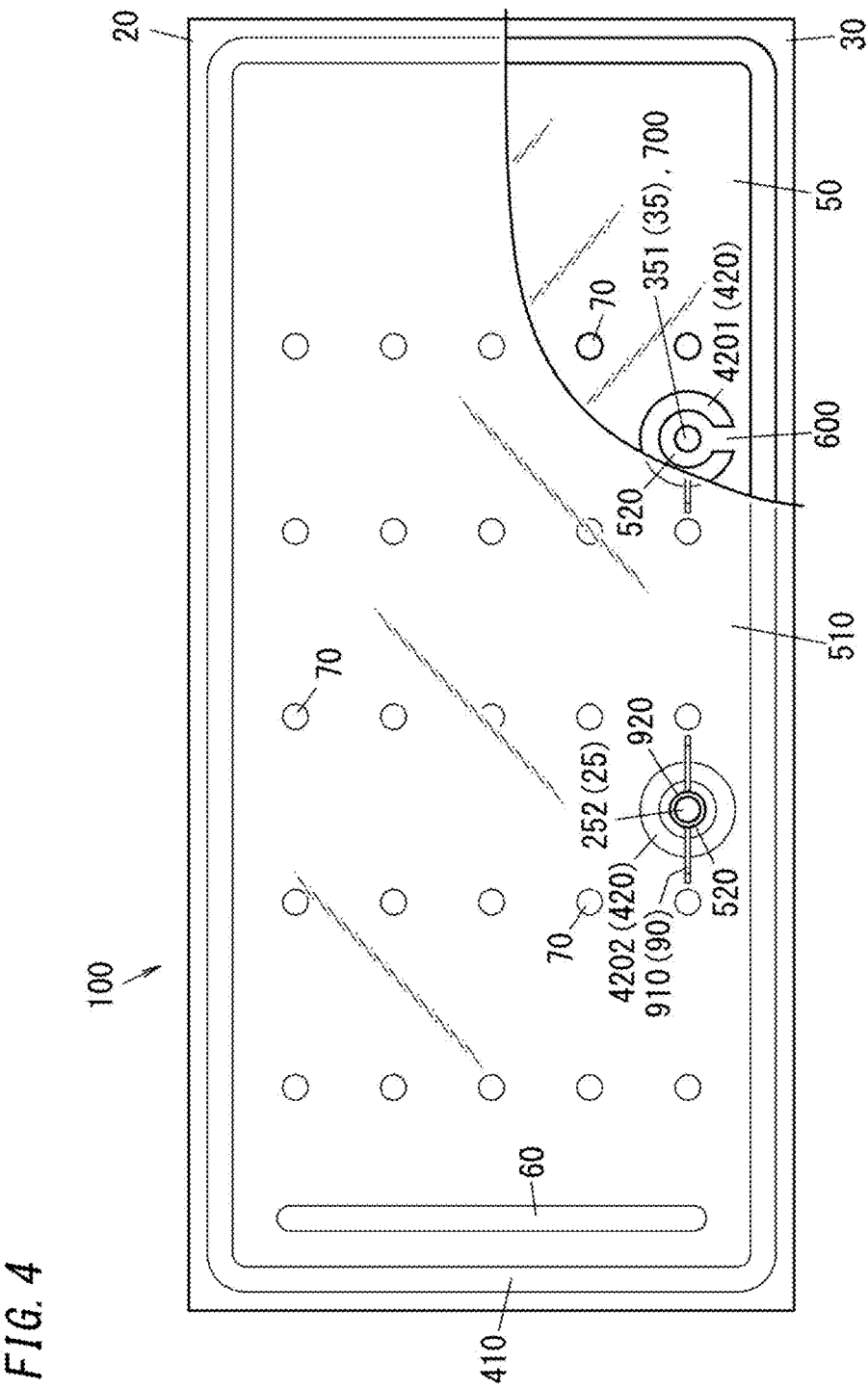
FIG. 4 is a partially cutaway, schematic plan view of the assembly.

The (final product of the) glass panel unit 10 is obtained by subjecting an assembly 100 shown in FIGS. 3 and 4 to a predetermined process. The predetermined process will be outlined later.

The assembly 100 includes the first panel 20, the second panel 30, a first part 410 of a hot glue, the internal space 500, second parts 420 of the hot glue, an exhaust path 600 that allows the first space and one of the second spaces to communicate with each other, an exhaust port 700, the gas adsorbent 60, and the plurality of pillars 70.

The first panel 20 includes a first glass pane 21 that defines a planar shape of the first panel 20 and a coating 22.

The first glass pane 21 is a rectangular flat plate and has a first surface (i.e., the lower surface in FIG. 3) and a second surface (i.e., the upper surface in FIG. 3), which are provided on both ends in a thickness direction to be parallel to each other. The first and second surfaces of the first glass pane 21 are both flat surfaces. Examples of materials for the first glass pane 21 include soda lime glass, high strain point glass, chemically tempered glass, alkali-free glass, quartz glass, Neoceram, and thermally tempered glass.

The coating 22 is formed on the first surface of the first glass pane 21. The coating 22 may be an infrared reflective film, for example. The coating 22 has electrical conductivity. Note that the coating 22 does not have to be an infrared reflective film but may also be a film with desired physical properties. Optionally, the first panel 20 may consist of the first glass pane 21 alone. In short, the first panel 20 includes the first glass pane 21 to say the least.

The second panel 30 includes a second glass pane 31 that defines the planar shape of the second panel 30. The second glass pane 31 is a rectangular flat plate and has a first surface (i.e., the upper surface in FIG. 3) and a second surface (i.e., the lower surface in FIG. 3), which are provided on both ends in the thickness direction to be parallel to each other. The first and second surfaces of the second glass pane 31 are both flat surfaces.

The second glass pane 31 may have the same planar shape and planar dimensions as the first glass pane 21. That is to say, the second panel 30 has the same planar shape as the first panel 20. In addition, the second glass pane 31 has the same thickness as the first glass pane 21. Examples of materials for the second glass pane 31 include soda lime glass, high strain point glass, chemically tempered glass, alkali-free glass, quartz glass, Neoceram, and thermally tempered glass.

The second panel 30 consists of the second glass pane 31 only. That is to say, the second glass pane 31 is the second panel 30 itself. Optionally, the second panel 30 may have a coating on either surface thereof. The coating is a film having desired physical properties such as an infrared reflective film. In that case, the second panel 30 is made up of the second glass pane 31 and the coating. In short, the second panel 30 includes the second glass pane 31 to say the least.

The second panel 30 is arranged to face the first panel 20. Specifically, the first panel 20 and the second panel 30 are arranged such that the first surface of the first glass pane 21 and the first surface of the second glass pane 31 face each other and are parallel to each other.

The first part 410 of the hot glue is arranged between the first panel 20 and the second panel 30 to hermetically bond the first panel 20 and the second panel 30 together as shown in FIG. 3. The first part 410 is a part that will serve as the seal 40. In this manner, an internal space 500 surrounded with the first part 410, the first panel 20, and the second panel 30 is formed.

The first part 410 is formed of a hot glue (i.e., a first hot glue having a first softening point). The first hot glue may be a glass frit, for example. The glass frit may be a low-melting glass frit, for example. Examples of the low-melting glass frits include bismuth-based glass frits, lead-based glass frits, and vanadium-based glass frits.

The first part 410 is arranged to form a rectangular frame shape in a plan view as shown in FIG. 4. When viewed in plan, the dimensions of the first part 410 are smaller than those of the first glass pane 21 or the second glass pane 31. The first part 410 is formed along the outer periphery of the upper surface of the second panel 30 (i.e., the first surface of the second glass pane 31). That is to say, the first part 410 is formed to surround almost the entire area on the second panel 30 (i.e., the entire area of the first surface of the second glass pane 31).

The first panel 20 and the second panel 30 are hermetically bonded together via the first part 410 by once melting the first hot glue of the first part 410 at a predetermined temperature (first melting temperature) Tm1, which is equal to or higher than the first softening point.

The second parts 420 of the hot glue are arranged in the internal space 500. The second parts 420 are partitions for partitioning the internal space 500 into a first space 510 to be a hermetically sealed space (i.e., a space to define an evacuated space 50 by being hermetically sealed when the glass panel unit 10 is completed) and second spaces 520, one of which will be an exhaust space (i.e., a space communicating with the exhaust port 700). The second parts 420 are parts that will serve as the boundary walls 42. The second parts 420 are formed such that the first space 510 is larger than any of the second spaces 520.

The second parts 420 are formed of a hot glue (i.e., a second hot glue having a second softening point). The second hot glue may be a glass frit, for example. The glass frit may be a low-melting glass frit, for example. Examples of the low-melting glass frits include bismuth-based glass frits, lead-based glass frits, and vanadium-based glass frits. The second hot glue is the same as the first hot glue. The second softening point is equal to the first softening point.

The exhaust port 700 is a hole that allows one of the second spaces 520 to communicate with the external environment. The exhaust port 700 is used to exhaust a gas from the first space 510 via the second space 520 and the exhaust path 600. The exhaust port 700 is provided through the second panel 30 to allow the second space 520 to communicate with the external environment. Specifically, the exhaust port 700 is located at a corner portion of the second panel 30. Note that although the exhaust port 700 is provided through the second panel 30 in the first embodiment, the exhaust port 700 may be provided through the first panel 20. In the first embodiment, a second through hole 351 to be described later also serves as the exhaust port 700.

The gas adsorbent 60 is arranged in the first space 510. Specifically, the gas adsorbent 60 has an elongate shape and provided at a longitudinal end of the second panel 30 so as to extend along a shorter side of the second panel 30. That is to say, the gas adsorbent 60 is arranged at an end of the first space 510 (evacuated space 50). This may make the gas adsorbent 60 much less conspicuous. In addition, this also reduces the chances of the gas adsorbent 60 obstructing exhausting the gas from the first space 510.

The gas adsorbent 60 is used to adsorb unnecessary gases (such as a residual gas). The unnecessary gases are released from the first part 410 and the second parts 420 when the first part 410 and the second parts 420 are heated to the first melting temperature Tm1, for example.

The gas adsorbent 60 includes a getter. The getter is a material having the property of adsorbing molecules, of which the size is smaller than a predetermined size. The getter may be an evaporative getter, for example. The evaporative getter has the property of releasing the adsorbed molecules when heated to a predetermined temperature (activation temperature) or more. This allows, even if the adsorption ability of the evaporative getter has declined once, the evaporative getter to recover its adsorption ability by heating the evaporative getter to the activation temperature or more. The evaporative getter may be either zeolite or an ion-exchanged zeolite (e.g., zeolite exchanged with copper ions).

The gas adsorbent 60 includes a powder of this getter. Specifically, the gas adsorbent 60 is formed by applying a solution in which a powder of the getter is dispersed. This allows the gas adsorbent 60 to have a reduced size. In that case, the gas adsorbent 60 may still be arranged even in a narrow, evacuated space 50.

The plurality of pillars 70 is used to maintain a predetermined gap distance between the first panel 20 and the second panel 30. That is to say, the plurality of pillars 70 serves as a spacer for maintaining a desired gap distance between the first panel 20 and the second panel 30.

The plurality of pillars 70 are placed in the first space 510. Specifically, the pillars 70 are placed at respective intersections of a rectangular (or square) grid. The plurality of pillars 70 may have an interval of 2 cm, for example. However, this is only an example and should not be construed as limiting. Rather, the size, number, spacing, and placement pattern of the pillars 70 may be selected appropriately.

The pillars 70 are made of a transparent material in this embodiment. Alternatively, the pillars 70 may also be made of an opaque material as long as the size of the pillars 70 is sufficiently small. The material for the pillars 70 is selected such that the pillars 70 will not be deformed in the internal space forming step (to be described later). The material for the pillars 70 is selected so as to allow the pillars 70 to have a softening point (softening temperature) higher than the first softening point of the first hot glue and the second softening point of the second hot glue, for example.

In such an assembly 100, the first space 510 is turned into the evacuated space 50 by exhausting, at a predetermined temperature (exhaust temperature) Te, the gas from the first space 510 through a path made up of the exhaust path 600, one of the second spaces 520, and the exhaust port 700 and allowing the gas to be exhausted into the external environment. The exhaust temperature Te is set at a temperature higher than the getter activation temperature of the gas adsorbent 60. This enables not only exhausting the gas from the first space 510 but also letting the getter recover its adsorption ability at a time.

In addition, as shown in FIG. 2, the evacuated space 50 is surrounded with the seal 40 and the boundary walls 42 by deforming the second parts 420 (see FIG. 4) and thereby forming the boundary wall 42 that close the exhaust path 600. That is to say, in the first embodiment, the seal 40 defines the outer peripheral edges of the evacuated space 50 and the boundary walls 42 define the inner peripheral edges of the evacuated space 50. The second parts 420 include the second hot glue. Therefore, if the second hot glue is once melted by locally heating the second parts 420, the second parts 420 may be deformed to form the boundary walls 42.

The second parts 420 are deformed to close the exhaust path 600 as shown in FIG. 2. The boundary walls 42 that have been formed by deforming the second parts 420 in this manner spatially separate the evacuated space 50 from the second spaces 520. The seal 40 surrounding the evacuated space 50 is made up of the boundary walls 42 and a part 41 other than the boundary walls 42.

The (final product of the) glass panel unit 10 thus obtained includes the first panel 20, the second panel 30, the seal 40, the evacuated space 50, the second space 520, the gas adsorbent 60, and the plurality of pillars 70 as shown in FIG. 2.

The evacuated space 50 is formed by exhausting the gas from the first space 510 through one of the second spaces 520 and the exhaust port 700 as described above. In other words, the evacuated space 50 is the first space 510, of which the degree of vacuum is equal to or less than a predetermined value. The predetermined value may be 0.1 Pa, for example. The evacuated space 50 is perfectly hermetically sealed by the first panel 20, the second panel 30, and the seal 40, and therefore, is separated from the second spaces 520 and the exhaust port 700.

The seal 40 not only surrounds the evacuated space 50 entirely but also hermetically bonds the first panel 20 and the second panel 30 together. The seal 40 includes the part 41 which has a frame shape and (spatially) separates the first space 510 from the external environment and the boundary walls 42 that separate the first space 510 from the second spaces 520. The boundary walls 42 are formed by deforming the second parts 420.

Next, a method for manufacturing the glass panel unit 10 according to the first embodiment will be described with reference to FIGS. 5-7.

A method for manufacturing the glass panel unit 10 according to the first embodiment includes at least a glue arrangement step, a glass composite producing step, an internal space forming step, an evacuation step, and an evacuated space forming step. The method may further include other process steps, which are optional ones. This method will now be described step by step sequentially.

In the first embodiment, first, a substrate forming step is performed although not shown. The substrate forming step is the process step of forming the first panel 20 and the second panel 30. Specifically, the substrate forming step includes making the first panel 20 and the second panel 30, for example. In addition, the substrate forming step may further include cleaning the first panel 20 and the second panel 30 as needed.

Next, the process step of providing first through holes 25, second through holes 35, and an exhaust port 700 (hereinafter referred to as an "exhaust port providing step") is performed. This process step includes providing first through holes 25 through portions, corresponding to the second spaces 520, of the first panel 20. In the first embodiment, two first through holes 25, namely, one first through hole 251 and the other first through hole 252, are provided (see FIG. 6). This process step also includes providing second through holes 35 through portions, corresponding to the second spaces 520, of the second panel 30. In the first embodiment, two second through holes 35, namely, one second through hole 351 and the other second through hole 352, are provided (see FIG. 6). The one second through hole 351 also serves as the exhaust port 700. Optionally, the exhaust port 700 may be provided through the first panel 20. That is to say, the exhaust port 700 may be provided through at least one of the first panel 20 or the second panel 30.

Figure 6:
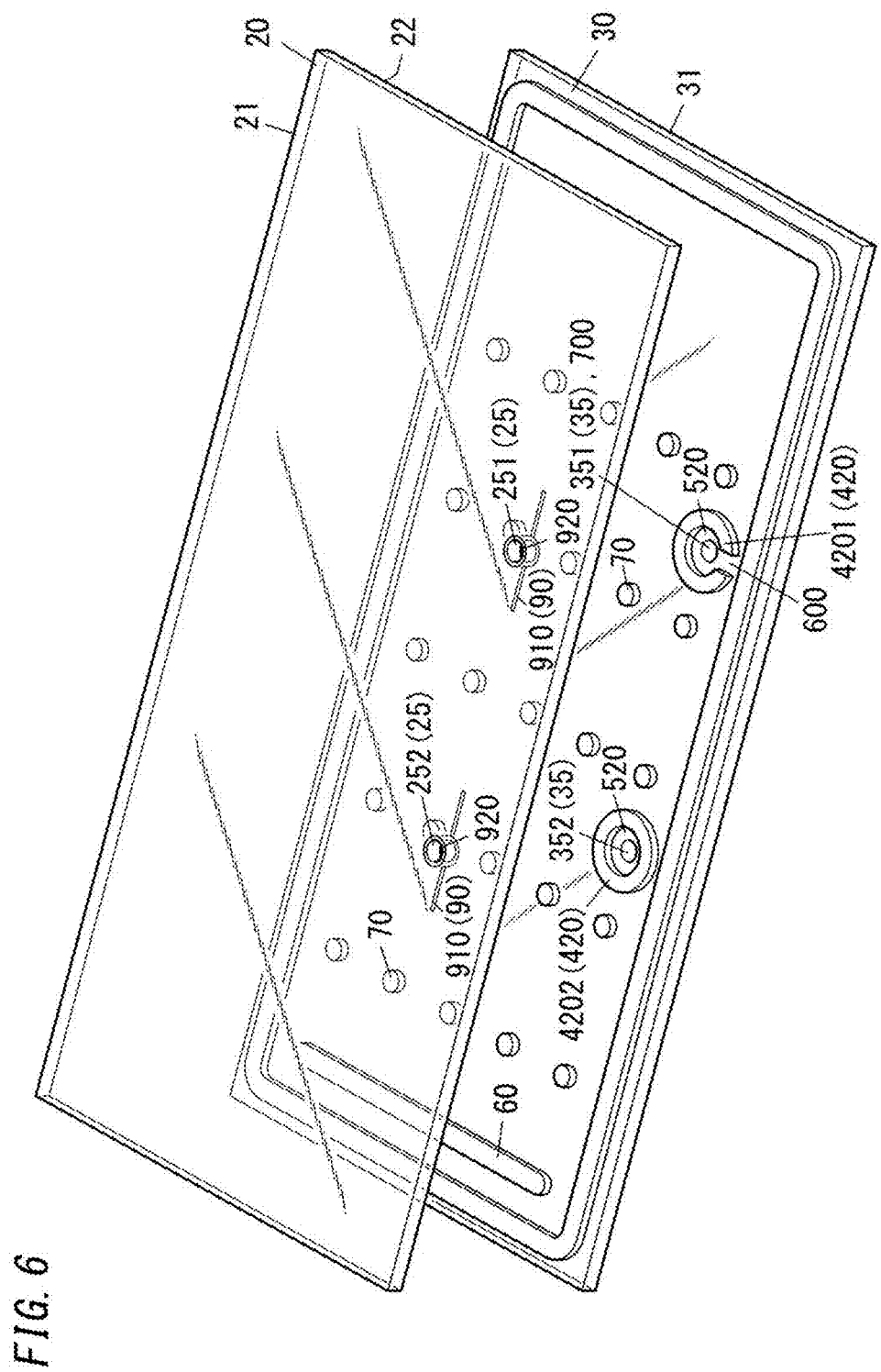
FIG. 6 illustrates another process step of the method for manufacturing the glass panel unit.

Next, electric wires 910 are arranged (see FIG. 6). In the first embodiment, each electric wire 910 is arranged to extend from a portion corresponding to the first space 510 to an associated one of the first through holes 25 (251, 252) serving as connecting voids. One end, facing the first space 510, of each electric wire 910 is electrically connected to the coating 22 (see FIG. 1).

In addition, each of the first through holes 25 (251, 252) is also provided with a cylindrical member 920 having electrical conductivity (see FIG. 6). The other end, facing an associated connecting void (first through hole 25), of each electric wire 910 is electrically connected to the cylindrical member 920 (see FIG. 1). An electrically conductive member 90 is formed of the electric wire 910 and the cylindrical member 920.

Figure 5:
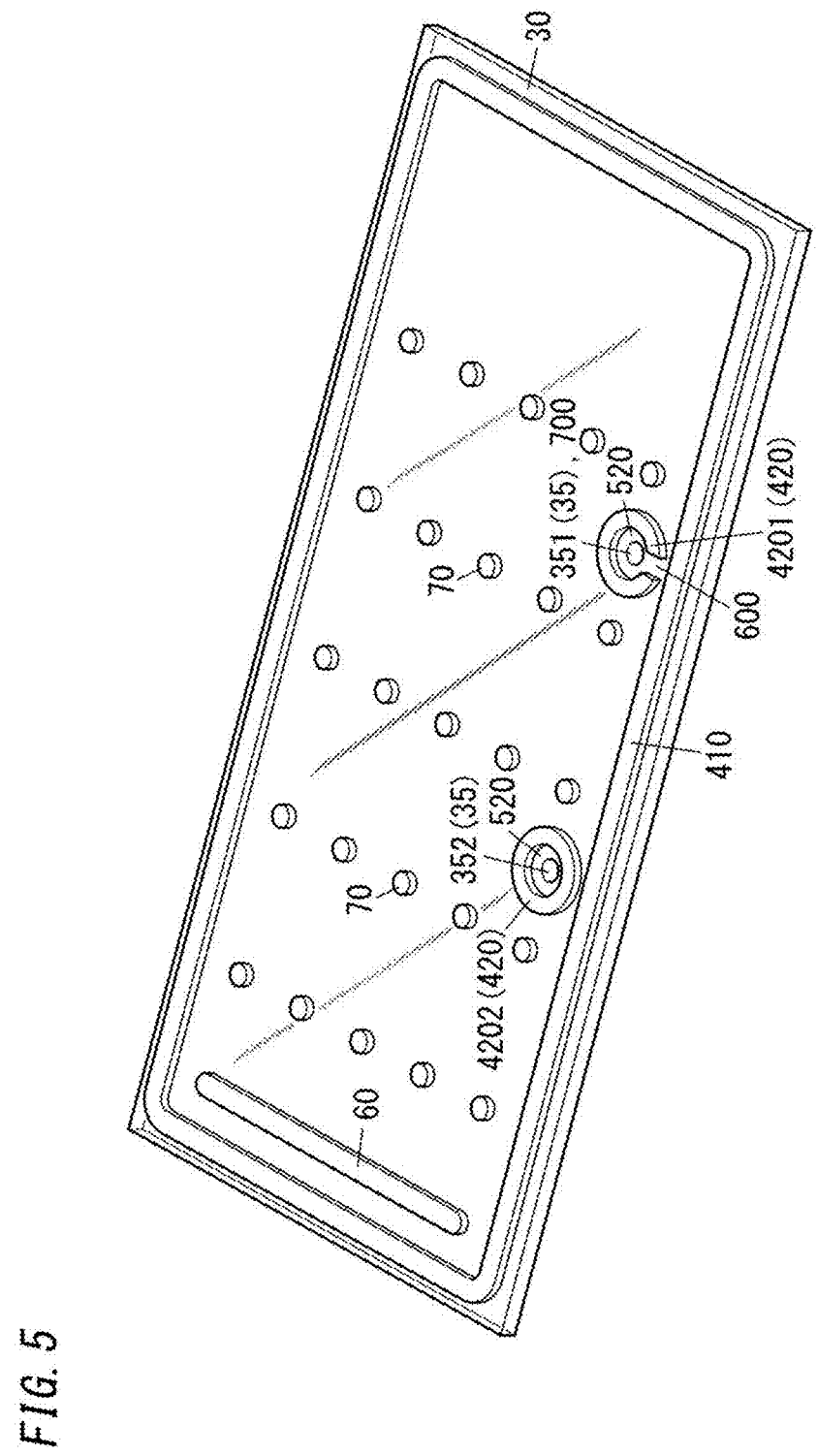
FIG. 5 illustrates a process step of a method for manufacturing the glass panel unit.

Next, as shown in FIG. 5, the glue arrangement step is performed. The glue arrangement step is the process step of arranging a hot glue on either the first panel 20 or the second panel 30. Specifically, the glue arrangement step includes forming, on the second panel 30, a first part 410 of the hot glue, which will serve as the seal 40, and second parts 420 of the hot glue, which will serve as boundary walls 42. The glue arrangement step includes applying, onto the second panel 30 (i.e., the first surface of the second glass pane 31), a material (first hot glue) for the first part 410 and a material (second hot glue) for the second parts 420 by using a dispenser, for example.

In the first embodiment, one second part 4201 is formed to surround the second through hole 351 almost entirely (see FIG. 6). The circumference of the second part 4201 is partially discontinued to form the exhaust path 600. Meanwhile, the other second part 4202 is formed to surround the second through hole 352 (see FIG. 6). The second part 4202 has a continuous circumference and forms no exhaust paths.

Optionally, the glue arrangement step may include calcining the respective materials for the first part 410 and the second parts 420 while drying these materials. For example, the glue arrangement step may include heating the second panel 30 on which the material for the first part 410 and the material for the second parts 420 are applied and may also include heating the first panel 20 along with the second panel 30. That is to say, the first panel 20 may be heated under the same condition as the second panel 30. This may reduce the difference in the degree of warpage between the first panel 20 and the second panel 30.

Subsequently, a pillar forming step is performed. Specifically, the pillar forming step includes forming a plurality of pillars 70 in advance and placing the plurality of pillars 70 at predetermined locations on the second panel 30 by using a chip mounter, for example. Optionally, the plurality of pillars 70 may be formed by photolithography and etching techniques. In that case, the plurality of pillars 70 may be made of a photocurable material, for example. Alternatively, the plurality of pillars 70 may also be formed by a known thin film forming technique.

Next, a gas adsorbent forming step is performed. Specifically, the gas adsorbent forming step includes forming the gas adsorbent 60 by applying a solution, in which a getter powder is dispersed, onto a predetermined location on the second panel 30 and drying the solution. Note that the glue arrangement step, the pillar forming step, and the gas adsorbent arrangement step may be formed in an arbitrary order.

Thereafter, the glass composite producing step is performed. The glass composite producing step is the process step of producing a glass composite by arranging the second panel 30 with respect to the first panel 20 such that the second panel 30 faces the first panel 20 with the first through holes 25 aligned with the second through holes 35 as shown in FIG. 6. The glass composite includes the first panel 20, the second panel 30, and the hot glue (in the first part 410 and the second parts 420). In the first embodiment, the first through hole 251 and the second through hole 351 face each other and the first through hole 252 and the second through hole 352 face each other.

The first panel 20 and the second panel 30 are arranged and laid one on top of the other such that the first surface of the first glass pane 21 and the first surface of the second glass pane 31 face each other and are parallel to each other. The hot glue comes into contact with the first panel 20 and the second panel 30, thus forming the glass composite.

Then, the internal space forming step is performed. The internal space forming step is the process step of heating the glass composite to melt the hot glue and thereby form the first part 410 that will serve as the seal 40 and the second parts 420 (partitions) that will be boundary walls 42. Specifically, the internal space forming step includes bonding the first panel 20 and the second panel 30 together to prepare the assembly 100. That is to say, the internal space forming step is the process step of hermetically bonding the first panel 20 and the second panel 30 together with the first part 410 and the second parts 420 (i.e., a bonding step).

The seal 40 is a frame-shaped member for hermetically bonding the respective peripheral edge portions of the first panel 20 and the second panel 30 to form the internal space 500 between the first panel 20 and the second panel 30. The first part 410 serves as the seal.

The second parts 420 (partitions) partition the internal space 500 into the first space 510 that is hermetically sealed except the exhaust path 600 and the second spaces 520 that are spatially separated from the first space 510 and communicate with the first through holes 25 and the second through holes 35. The second parts 420 hermetically bond the first panel 20 and the second panel 30 together. One second part 4201 has the exhaust path 600. The other second part 4202 has no exhaust paths but is a boundary wall 422 (42) that serves as a seal.

The internal space forming step includes once melting the first hot glue at a predetermined temperature (first melting temperature) Tm1 equal to or higher than the first softening point and thereby hermetically bonding the first panel 20 and the second panel 30 together. Specifically, the glass composite is arranged in a melting furnace and heated to the first melting temperature Tm1 for a predetermined period (first melting period) tm1.

The first melting temperature Tm1 and the first melting period tm1 are set such that the first panel 20 and the second panel 30 are hermetically bonded with the first part 410 and the second parts 420 but that the exhaust path 600 is not closed with one of the second parts 420. That is to say, the lower limit of the first melting temperature Tm1 is the first softening point, while the upper limit of the first melting temperature Tm1 is set such that the exhaust path 600 is not closed by that one of the second parts 420. For example, if the first softening point and the second softening point are 290° C., then the first melting temperature Tm1 is set at 300° C. Also, the first melting period tm1 may be 10 minutes, for example. Note that in the internal space forming step, a gas is released from the first part 410 and the second parts 420 but is adsorbed into the gas adsorbent 60.

In the internal space forming step, the first part 410 and second parts 420 yet to be softened of the glass composite soften and the first part 410 and second parts 420 thus softened bond the first panel 20 and the second panel 30 together. As a result, the assembly 100 shown in FIGS. 3 and 4 is obtained.

Next, the evacuation step is performed. The evacuation step is the process step of evacuating the first space 510 by exhausting the gas from the first space 510. Specifically, the evacuation step is the process step of evacuating the first space 510 by exhausting, at a predetermined temperature (exhaust temperature) Te, the gas from the first space 510 via the exhaust path 600, one of the second spaces 520, and the exhaust port 700 (second through hole 351).

Although not shown, the evacuation step is performed with an exhaust port portion, a closing member, a clip, and a vacuum pump (not shown) used. The vacuum pump is connected to an exhaust port portion which s hermetically connected to the second through hole 351. The closing member closes the first through hole 251. The clip is used to clamp the exhaust port portion and the closing member such that the exhaust port portion and the closing member are close to each other. The first space may be evacuated by exhausting the gas from the first space with the vacuum pump operated in such a state.

The evacuation step includes exhausting the gas from the first space 510 at an exhaust temperature Te for a predetermined period (exhaust period) te through the exhaust path 600, the one of the second spaces 520, and the exhaust port 700.

The exhaust temperature Te is set at a temperature higher than the getter activation temperature (of 240° C., for example) of the gas adsorbent 60 but lower than the first softening point and the second softening point (of 290° C., for example). The exhaust temperature Te may be 250° C., for example.

This may prevent the first part 410 and the second parts 420 from being deformed. In addition, the getter of the gas adsorbent 60 is activated and the molecules (of a gas) that have been adsorbed into the getter are released from the getter. Then, the molecules (i.e., the gas) released from the getter are exhausted through the first space 510, the exhaust path 600, the one of the second spaces 520, and the exhaust port 700. Thus, in the internal space forming step, the gas adsorbent 60 recovers its adsorption ability.

The exhaust period te is set to create an evacuated space 50 with a desired degree of vacuum (e.g., a degree of vacuum of 0.1 Pa or less). The evacuation period te may be set 120 minutes, for example.

Optionally, the evacuation step may start being performed either after, or during, the internal space forming step, whichever is appropriate. In the latter case, the evacuation step is performed in parallel with the internal space forming step.

Next, the evacuated space forming step (sealing step) is performed. The evacuated space forming step is the process step of sealing the first space 510 by closing the exhaust path 600 with the partitions deformed while keeping the first space 510 evacuated and thereby turning the first space 510 into a hermetically sealed evacuated space 50.

Specifically, in the first embodiment, the evacuated space forming step is the process step of forming a boundary wall 421 (42) (see FIG. 2) that surrounds the evacuated space 50 by deforming the second part 4201 as a partition and closing the exhaust path 600. The evacuated space forming step includes locally heating the second part 4201 to a predetermined temperature (second melting temperature) equal to or higher than the second softening point. For the purpose of this local heating, an irradiator configured to emit a laser beam may be used, for example. The irradiator may irradiate the second part 4201 with a laser beam through the second panel 30 from outside of the assembly 100. Note that the local heating may be performed with any member other than the irradiator and the method of local heating is not limited to any particular one.

In the first embodiment, the gas is continuously exhausted in the evacuated space forming step with the same vacuum pump as the one used in the evacuation step still used in the evacuated space forming step. However, this is only an example and should not be construed as limiting. Alternatively, the gas does not have to be exhausted continuously in the evacuated space forming step with the same vacuum pump as the one used in the evacuation step used continuously, as long as a desired degree of vacuum may be maintained.

In this manner, a glass panel unit 10 is obtained. As shown in FIG. 1, the electric wire 910 is arranged to extend from the internal space 500 to the connecting void (first through hole 25) by passing through the seal 40. This allows the electric wire 910 to be extended out of the glass panel unit 10 to supply the internal space 500 with electricity.

Figure 7:
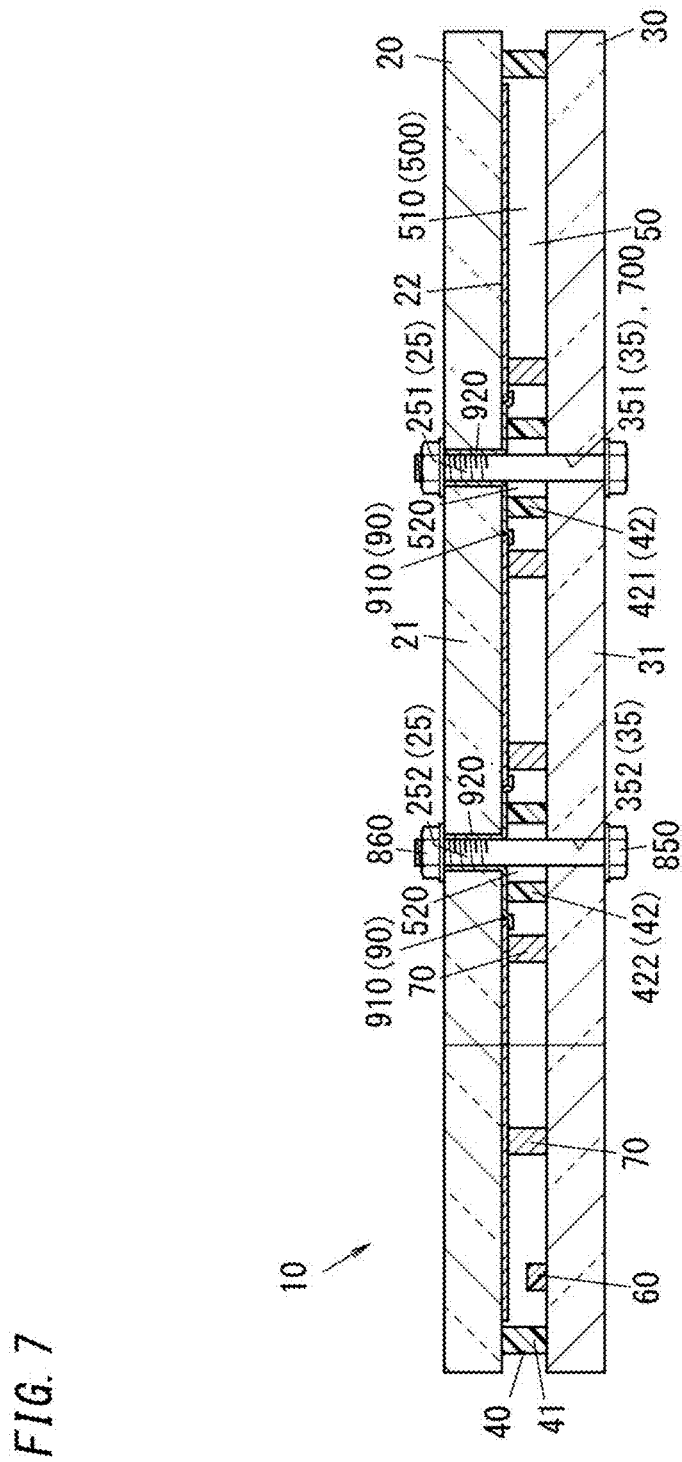
FIG. 7 is a schematic vertical sectional view illustrating a state of the glass panel unit where nuts and bolts are attached thereto.

For example, as shown in FIG. 7, a bolt 850 may be passed through each second through hole 35 (351, 352) and the tip of the bolt 850 protruding through an associated first through hole 25 (251, 252) may be screwed into a nut 860. The bolt 850 comes into contact with the cylindrical member 920 and thereby is electrically connectible to the electrically conductive member 90. Interposing an external electric wire, terminal, or any other member between either the head of the bolt 850 or the nut 860 and the surface of glass panel unit 10 allows the external electric wire, terminal, or any other member to be electrically connected to the head of the bolt 850, the nut 860, and eventually the electrically conductive member 90.

In this case, the bolt 850 is arranged in each of the connecting voids (first through holes 25) and hardly protrudes from the outer surface of the glass panel unit 10. In addition, the electric wire 910 is not extended out of the connecting void and does not protrude from the outer surface of glass panel unit 10, and therefore, is hardly disconnected.

Optionally, the internal space 500 may be supplied with electricity through the electrically conductive member 90 provided for the first through hole 251 and the electrically conductive member 90 provided for the first through hole 252 to allow this glass panel unit 10 to serve as a defroster. Alternatively, unless the coating 22 is provided, for example, the electrically conductive member 90 provided for the first through hole 251 and the electrically conductive member 90 provided for the first through hole 252 may be made electrically conductive with each other via a heater wire, instead of the coating 22. Still alternatively, an antenna, not the heater wire, may be connected to the electrically conductive member 90 provided for the first through hole 251 and the electrically conductive member 90 provided for the first through hole 252.

Figure 8:
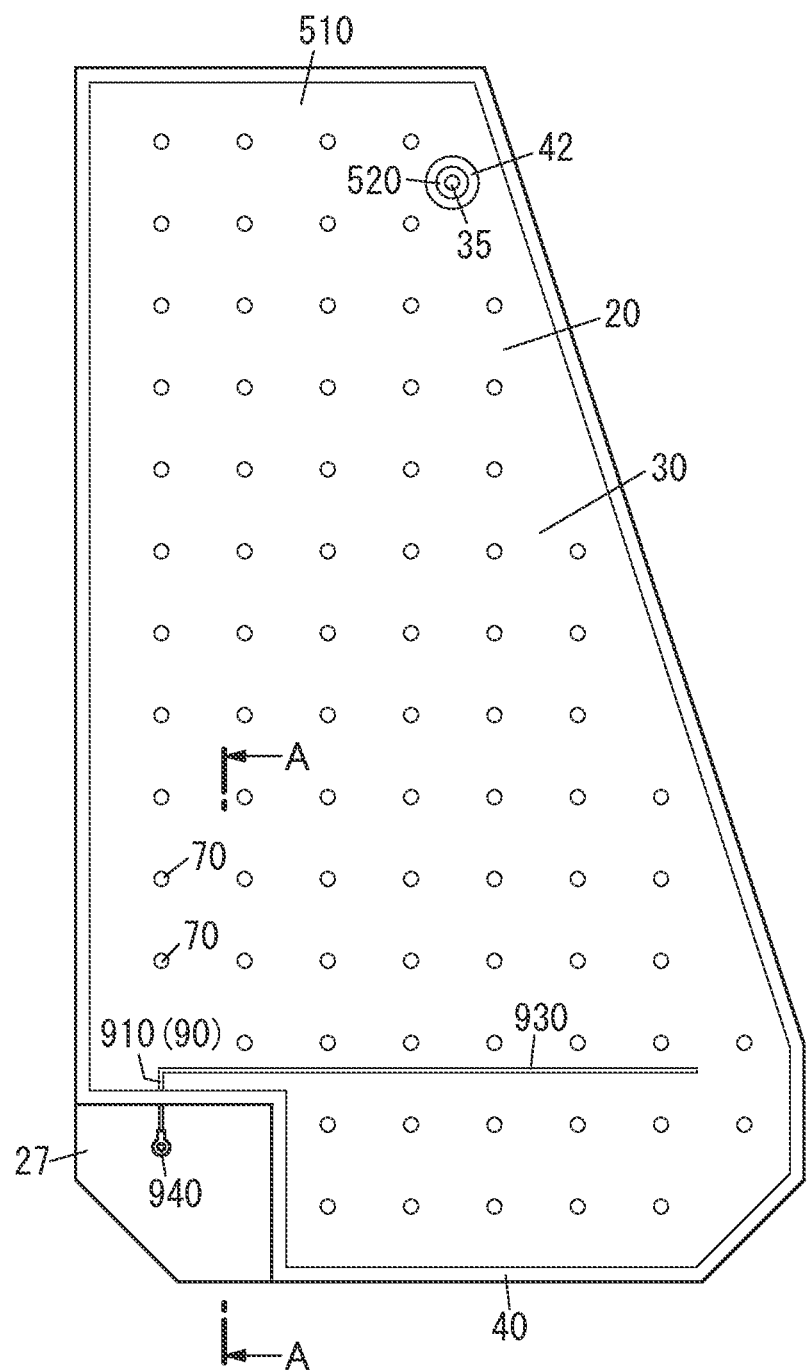
FIG. 8 is a schematic plan view of a glass panel unit according to a second embodiment.
Figure 9:
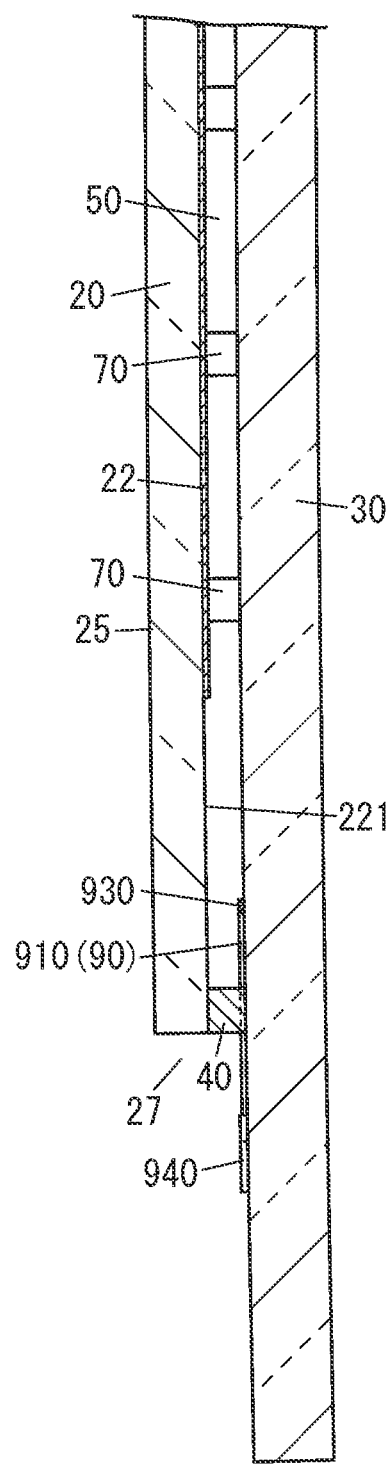
FIG. 9 is a partially enlarged, schematic vertical sectional view of the glass panel unit.

Next, a glass panel unit 10 according to a second embodiment will be described with reference to FIGS. 8 and 9. Note that the second embodiment is mostly the same as the first embodiment described above, and therefore, some features of the second embodiment that are shared in common with the first embodiment will not be described all over again to avoid redundancy.

In the first embodiment described above, the connecting voids are through holes (including the first through holes 25 and the second through holes 35). In the second embodiment, on the other hand, the connecting void is a cutout 27. The cutout 27 is provided through a portion of the first panel 20.

A terminal 940 is connected to one end, extended into the connecting void (cutout 27), of the electric wire 910. This allows an external electric wire to be connected to the electric wire 910 more easily.

On the other hand, an antenna (monopole antenna) 930 is connected to the other end, located in the first space 510, of the electric wire 910. In addition, a portion, facing the antenna 930, of the coating 22 is provided with a cutout 221 as shown in FIG. 9, thus reducing the chances of causing a decline in the reception sensitivity of the antenna 930.

Figure 10A:
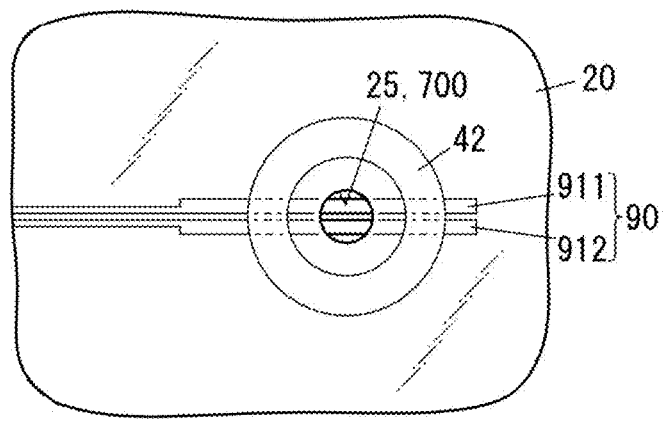
FIG. 10A is a partially enlarged, schematic plan view of a glass panel unit according to a third embodiment.
Figure 10B:
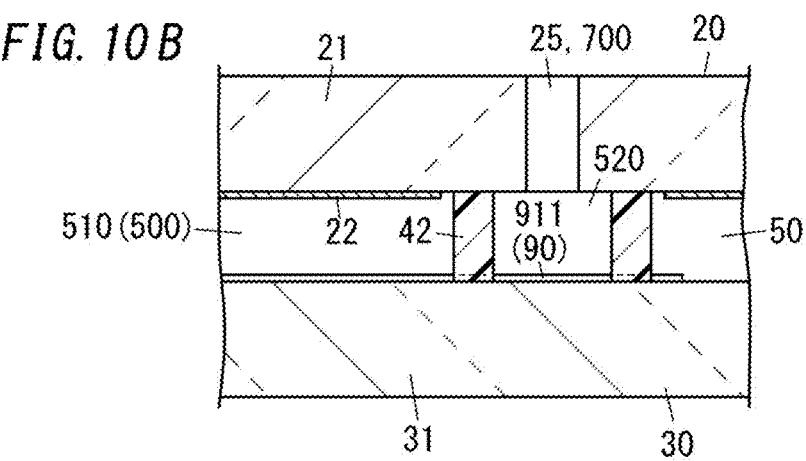
FIG. 10B is a partially enlarged, schematic vertical sectional view of the glass panel unit.

Next, a glass panel unit 10 according to a third embodiment will be described with reference to FIGS. 10A and 10B. Note that the third embodiment is mostly the same as the first embodiment described above, and therefore, some features of the third embodiment that are shared in common with the first embodiment will not be described all over again to avoid redundancy.

In the third embodiment, the electric wire 910 includes two electric wires 911 and 912, which are arranged in parallel with each other. These electric wires 911 and 912 form an electrical conductor pattern used to supply electricity to a heater, an antenna, a light-emitting element, or any other electrical device arranged in the evacuated space 50. An external electric wire, a terminal, or any other member may be connected to any of these electric wires 911, 912 through any of the first through holes 25 (connecting voids).

Figure 11A:
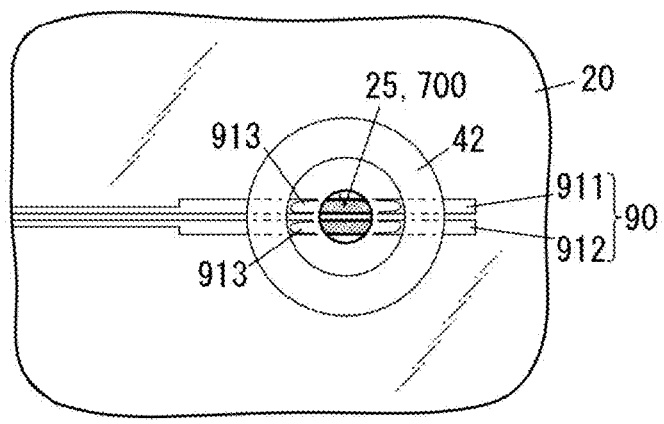
FIG. 11A is a partially enlarged, schematic plan view of a glass panel unit according to a fourth embodiment.
Figure 11B:
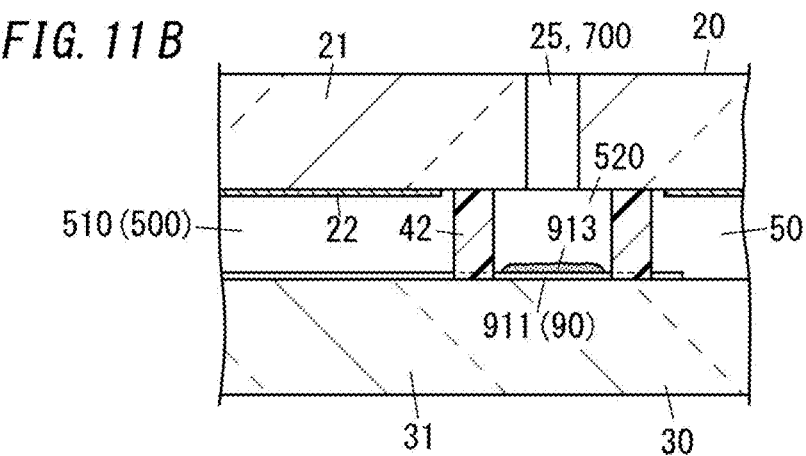
FIG. 11B is a partially enlarged, schematic vertical sectional view of the glass panel unit.

Next, a glass panel unit 10 according to a fourth embodiment will be described with reference to FIGS. 11A and 11B. Note that the fourth embodiment is mostly the same as the third embodiment described above, and therefore, some features of the fourth embodiment that are shared in common with the third embodiment will not be described all over again to avoid redundancy.

The fourth embodiment includes not only every constituent element of the third embodiment but also a thick terminal connector 913 provided for the electric wires 911 and 912. The thick terminal connector 913 is formed by depositing solder, a metallic plating, an Ag film electrode, or any other electrical conductor on the surface of each of the electric wires 911 and 912. Providing the thick terminal connectors 913 allows an external electric wire, a terminal, or any other member to be connected to the electric wires 911 and 912 with more reliability through any of the first through holes 25 (connecting void).

Figure 12A:
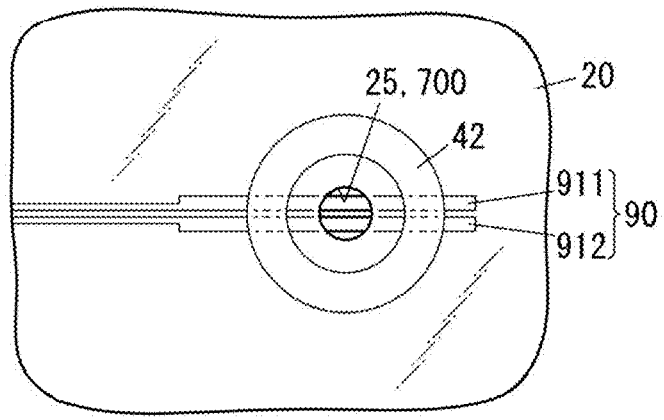
FIG. 12A is a partially enlarged, schematic plan view of a glass panel unit according to a fifth embodiment.
Figure 12B:
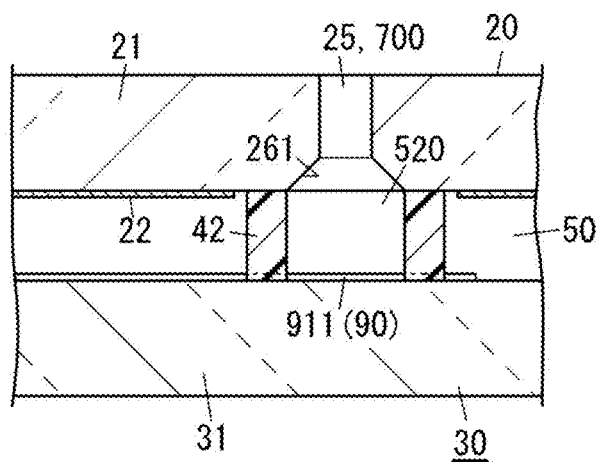
FIG. 12B is a partially enlarged, schematic vertical sectional view of the glass panel unit.
Figure 12C:
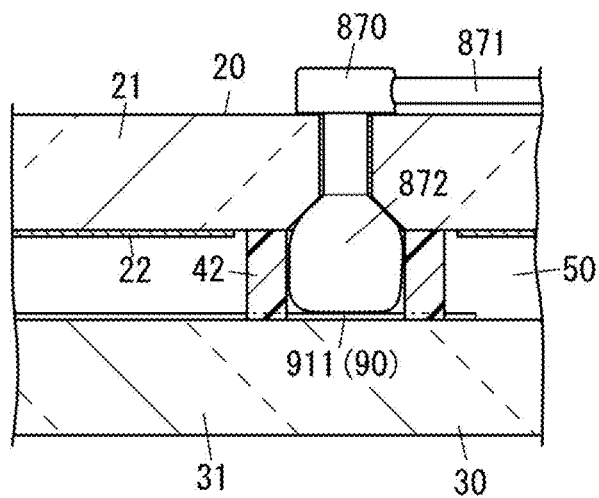
FIG. 12C is a partially enlarged, schematic vertical sectional view illustrating a state of the glass panel unit where a connector is attached thereto.

Next, a glass panel unit 10 according to a fifth embodiment will be described with reference to FIGS. 12A-12C. Note that the fifth embodiment is mostly the same as the third embodiment described above, and therefore, some features of the fifth embodiment that are shared in common with the third embodiment will not be described all over again to avoid redundancy.

In the fifth embodiment, one end portion, facing the second space 520, of one first through hole 25 serving as a connecting void is provided with a tapered recess 261, of which the diameter increases as the distance to the second space 520 decreases.

A connector 870 including a cable 871 and electrical contact portions 872 is attached into the first through hole 25. The connector 870 includes a tip portion, of which the diameter is almost equal to the diameter of the first through hole 25. The tip portion is provided with electrical contact portions 872. As the electrical contact portions 872, an electrical contact portion 872 to be connected to the electric wire 911 and another electrical contact portion 872 to be connected to the electric wire 912 are provided separately from each other. Each of the electrical contact portions 872 is configured as a metallic plate with flexibility and has its size determined to be fitted into the tapered recess 261. These two electrical contact portions 872 have electrical conductivity and are respectively electrically conductive with two electric wires in the cable 871.

When the connector 870 is attached to the first through hole 25, first, the electrical contact portions 872 are inserted into the first through hole 25. The electrical contact portions 872 have flexibility, and therefore, may shrink to pass through the first through hole 25. After having passed through the first through hole 25, the electrical contact portions 872 are expanded along the tapered recess 261. This allows the two electrical contact portions 872 to be firmly connected to the electric wires 911 and 912, respectively. In addition, this also reduces the chances of the connector 870 being disconnected accidentally from the first through hole 25.

Figure 13A:
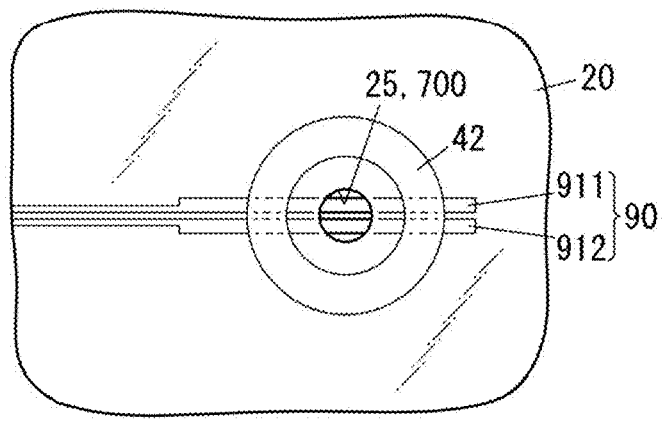
FIG. 13A is a partially enlarged, schematic plan view of a glass panel unit according to a sixth embodiment.
Figure 13B:
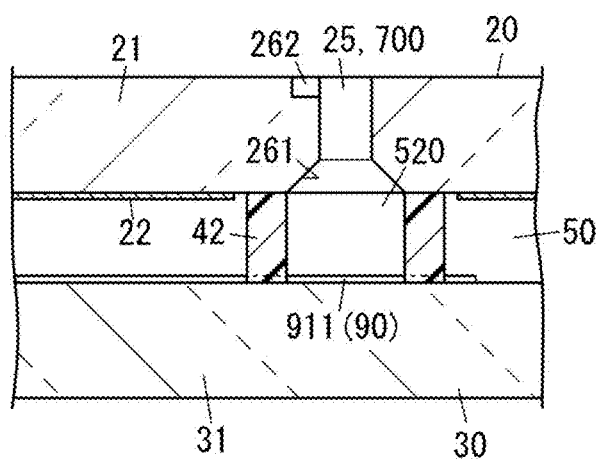
FIG. 13B is a partially enlarged, schematic vertical sectional view of the glass panel unit.
Figure 13C:
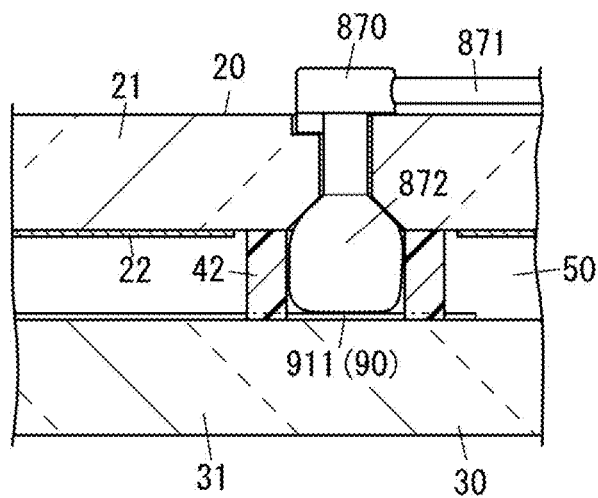
FIG. 13C is a partially enlarged, schematic vertical sectional view illustrating a state of the glass panel unit where a connector is attached thereto.

Next, a glass panel unit 10 according to a sixth embodiment will be described with reference to FIGS. 13A-13C. Note that the sixth embodiment is mostly the same as the fifth embodiment described above, and therefore, some features of the sixth embodiment that are shared in common with the fifth embodiment will not be described all over again to avoid redundancy.

The sixth embodiment includes not only every constituent element of the fifth embodiment described above but also a step portion 262, which is provided for an end portion, located adjacent to the external environment, of the first through hole 25 serving as a connecting void. The step portion 262 is provided locally for only a part of the circumference of the first through hole 25.

In addition, the connector 870 includes an insert portion to be inserted into the step portion 262. The insert portion forms part of an end portion, which will be located adjacent to the external environment and will face the step portion 262 when the insert portion is inserted into the first through hole 25, of the connector 870. Providing such a step portion 262 and insert portion locally for only a part of the circumference of the first through hole 25 allows the connector 870 to be inserted in a predetermined direction into the first through hole 25 and thereby allows associated electrical contact portions 872 to be connected to the electric wires 911 and 912, respectively.

Figure 14A:
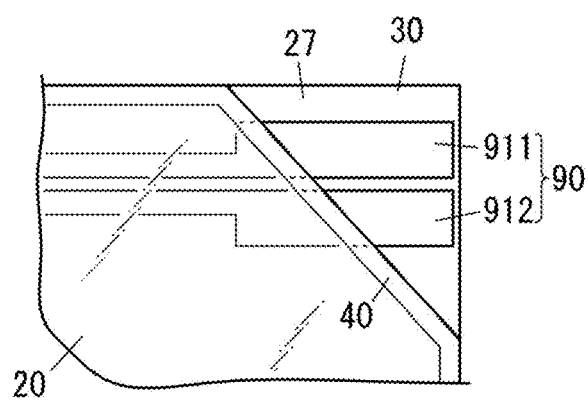
FIG. 14A is a partially enlarged, schematic plan view of a glass panel unit according to a seventh embodiment.
Figure 14B:
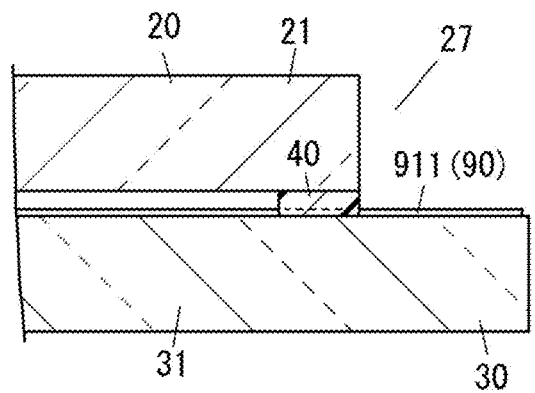
FIG. 14B is a partially enlarged, schematic vertical sectional view of the glass panel unit.

Next, a glass panel unit 10 according to a seventh embodiment will be described with reference to FIGS. 14A and 14B. Note that the seventh embodiment is mostly the same as the first embodiment described above, and therefore, some features of the seventh embodiment that are shared in common with the first embodiment will not be described all over again to avoid redundancy.

In the seventh embodiment, a cutout 27 serving as a connecting void is provided for one corner portion of the first panel 20 which has a rectangular shape in a plan view. This allows an external electric wire, a terminal, or any other member to be electrically connected to the electric wires 911 and 912 at the corner portion of the glass panel unit 10.

Figure 15A:
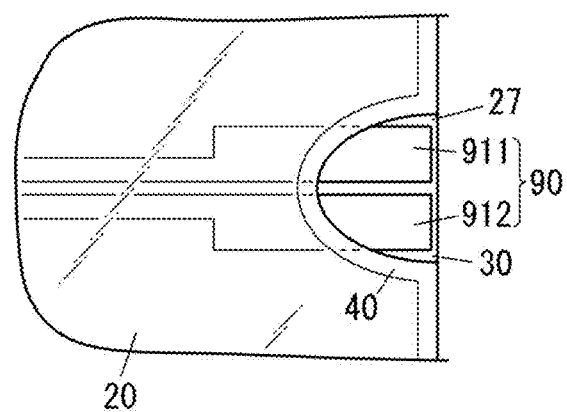
FIG. 15A is a partially enlarged, schematic plan view of a glass panel unit according to an eighth embodiment.
Figure 15B:
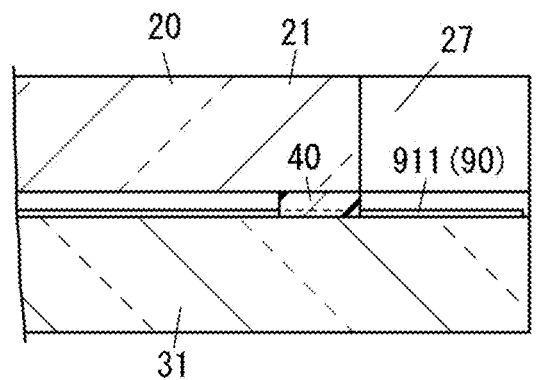
FIG. 15B is a partially enlarged, schematic vertical sectional view of the glass panel unit.

Next, a glass panel unit 10 according to an eighth embodiment will be described with reference to FIGS. 15A and 15B. Note that the eighth embodiment is mostly the same as the seventh embodiment described above, and therefore, some features of the eighth embodiment that are shared in common with the seventh embodiment will not be described all over again to avoid redundancy.

In the eighth embodiment, a cutout 27 serving as a connecting void is provided for a middle portion of one side of the first panel 20 which has a rectangular shape in a plan view. This allows an external electric wire, a terminal, or any other member to be electrically connected to the electric wires 911 and 912 at the middle portion of the one side of the glass panel unit 10.

Next, some variations will be enumerated one after another.

In the embodiments described above, the glass panel unit 10 has a rectangular shape. However, this is only an example and should not be construed as limiting. Alternatively, the glass panel unit 10 may also have a circular, polygonal, or any other desired shape. That is to say, the first panel 20, the second panel 30, and the seal 40 do not have to be rectangular but may also have a circular, polygonal, or any other desired shape. Also, the respective shapes of the first panel 20, the second panel 30, the part 41 corresponding to the evacuated space 50, and the boundary walls 42 do not have to be the ones used in the embodiments described above but may also be any other shapes that allow a glass panel unit 10 of a desired shape to be obtained. Note that the shape and dimensions of the glass panel unit 10 may be determined according to the intended use of the glass panel unit 10.

Also, neither the first surface nor the second surface of the first glass pane 21 of the first panel 20 has to be a plane. Likewise, neither the first surface nor the second surface of the second glass pane 31 of the second panel 30 has to be a plane.

The first glass pane 21 of the first panel 20 and the second glass pane 31 of the second panel 30 do not have to have the same planar shape and planar dimensions. The first glass pane 21 and the second glass pane 31 do not have to have the same thickness, either. In addition, the first glass pane 21 and the second glass pane 31 do not have to be made of the same material, either.

Optionally, the first panel 20 may further include a coating having desired physical properties and formed on the second surface of the first glass pane 21. Alternatively, the first panel 20 may include no coating 22. That is to say, the first panel 20 may consist of the first glass pane 21 alone.

Optionally, the second panel 30 may further include a coating having desired physical properties. The coating may include, for example, at least one of a thin film formed on the first surface of the second glass pane 31 or a thin film formed on the second surface of the second glass pane 31. Examples of the coating include an infrared reflective film and an ultraviolet reflective film, both of which reflect light having a particular wavelength.

In the embodiment described above, the internal space 500 is partitioned into a single first space 510 and a single second space 520. However, this is only an example and should not be construed as limiting. Alternatively, the internal space 500 may also be partitioned into one or more first spaces 510 and one or more second spaces 520.

In the embodiment described above, the second hot glue is the same as the first hot glue and the second softening point is equal to the first softening point. However, this is only an example and should not be construed as limiting. Alternatively, the second hot glue may also be a different material from the first hot glue. For example, the second hot glue may have a second softening point which is different from the first softening point of the first hot glue.

Furthermore, the first hot glue and the second hot glue do not have to be a glass frit but may also be a low-melting metal or a hot-melt adhesive, for example.

The glass panel unit 10 with the connecting voids is applicable for use in glass windows for stationary structures such as buildings, electrical equipment including refrigerator showcases for general consumers and storekeepers, and automobiles and other vehicles in the field of mobility.

As can be seen from the foregoing description of embodiments and their variations, a glass panel unit (10) according to a first aspect of the present disclosure includes a first panel (20), a second panel (30), a seal (40), a connecting void, and an electric wire (910). The first panel (20) includes a first glass pane (21). The second panel (30) includes a second glass pane (31) and is arranged to face the first panel (20). The seal (40) has a frame shape and hermetically bonds respective peripheral edge portions of the first panel (20) and the second panel (30) to create an internal space (500) between the first panel (20) and the second panel (30). The connecting void is provided for a portion, other than a portion facing the internal space (500), of at least one of the first panel (20) or the second panel (30). The electric wire (910) is extended from the internal space (500) to the connecting void by passing through the seal (40).

In the glass panel unit (10) according to the first aspect, the electric wire (910) is not extended out of the connecting void and does not protrude from the outer surface of the glass panel unit (10), and therefore, is hardly disconnected.

A glass panel unit (10) according to a second aspect of the present disclosure may be implemented in conjunction with the first aspect. In the glass panel unit (10) according to the second aspect, the connecting void is a through hole (first through hole 25) provided through at least one of the first panel (20) or the second panel (30).

In the glass panel unit (10) according to the second aspect, an end portion of the electric wire (910) just needs to be arranged to face the through hole (first through hole 25).

A glass panel unit (10) according to a third aspect of the present disclosure may be implemented in conjunction with the second aspect. In the glass panel unit (10) according to the third aspect, the connecting void includes two through holes (namely, a first through hole 25 and a second through hole 35) provided through the first panel (20) and the second panel (30), respectively, and facing each other.

The glass panel unit (10) according to the third aspect may have electrical connection established firmly by passing a bolt (850) or any other suitable member through the through holes (namely, the first through hole 25 and the second through hole 35).

A glass panel unit (10) according to a fourth aspect of the present disclosure may be implemented in conjunction with the first aspect. In the glass panel unit (10) according to the fourth aspect, the connecting void is a cutout (27) provided through an end edge portion of at least one of the first panel (20) or the second panel (30) when viewed in a direction in which the first panel (20) and the second panel (30) face each other.

In the glass panel unit (10) according to the fourth aspect, an end portion of the electric wire (910) just needs to be arranged to face the cutout (27).

A glass panel unit (10) according to a fifth aspect of the present disclosure may be implemented in conjunction with any one of the first to fourth aspects. The glass panel unit (10) according to the fifth aspect further includes a heater in the internal space (500). The heater is connected to the electric wire (910).

The glass panel unit (10) according to the fifth aspect allows an external electric wire to be connected, through the electric wire (910), to the heater arranged in the internal space (500).

A glass panel unit (10) according to a sixth aspect of the present disclosure may be implemented in conjunction with any one of the first to fourth aspects. The glass panel unit (10) according to the sixth aspect further includes an antenna (930) in the internal space (500). The antenna (930) is connected to the electric wire (910).

The glass panel unit (10) according to the sixth aspect allows an external electric wire to be connected, through the electric wire (910), to the antenna arranged in the internal space (500).

A glass panel unit (10) according to a seventh aspect of the present disclosure may be implemented in conjunction with the sixth aspect. In the glass panel unit (10) according to the seventh aspect, at least one of the first panel (20) or the second panel (30) further includes a coating (22). The coating (22) has a cutout (221) in a portion thereof facing the antenna (930).

The glass panel unit (10) according to the seventh aspect reduces the chances of causing a decline in the reception sensitivity of the antenna (930).

REFERENCE SIGNS LIST

10 Glass Panel Unit
20 First Panel
21 First Glass Pane
22 Coating
221 Cutout
25 First Through Hole (Connecting Void)
27 Cutout
30 Second Panel
31 Second Glass Pane
35 Second Through Hole (Connecting Void)
40 Seal
500 Internal Space
910 Electric Wire
930 Antenna

The invention claimed is:

1. A glass panel unit comprising:
a first panel including a first glass pane;
a second panel including a second glass pane and arranged to face the first panel;
a seal having a frame shape and hermetically bonding respective peripheral edge portions of the first panel and the second panel to create an internal space between the first panel and the second panel;
a connecting void; and
an electric wire,
wherein the connecting void is at least one through hole provided through a portion of at least one of the first panel and the second panel,
wherein the internal space includes a first space being a hermetically sealed space and a second space being an exhaust space,
wherein the seal includes a part which has a frame shape and separates the first space from external environment and a boundary wall that separates the first space from the second space,
wherein the portion of at least one of the first panel and the second panel corresponds to the second space, and
wherein the electric wire is extended from the first space to the at least one through hole by passing through the seal.

2. The glass panel unit of claim 1, wherein
the at least one through hole serving as the connecting void includes two through holes provided through the first panel and the second panel, respectively, and facing each other.

3. The glass panel unit of claim 2, further comprising a heater in the internal space, wherein
the heater is connected to the electric wire.

4. The glass panel unit of claim 2, further comprising an antenna in the internal space, wherein
the antenna is connected to the electric wire.

5. The glass panel unit of claim 4, wherein
at least one of the first panel or the second panel further includes a coating, and
the coating has a cutout in a portion thereof facing the antenna.

6. The glass panel unit of claim 1, further comprising a heater in the internal space, wherein
the heater is connected to the electric wire.

7. The glass panel unit of claim 1, further comprising an antenna in the internal space, wherein
the antenna is connected to the electric wire.

8. The glass panel unit of claim 7, wherein
at least one of the first panel or the second panel further includes a coating, and
the coating has a cutout in a portion thereof facing the antenna.

* * * * *